US010718395B2

(12) United States Patent
Krehmer et al.

(10) Patent No.: US 10,718,395 B2
(45) Date of Patent: Jul. 21, 2020

(54) SWITCHABLE BEARING BUSHING FOR A MOTOR VEHICLE

(71) Applicant: Schaeffler Technologies AG & Co. KG, Herzogenaurach (DE)

(72) Inventors: Hartmut Krehmer, Erlangen (DE); Peter Rumpel, Werneck / Schraudenbach (DE)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 80 days.

(21) Appl. No.: 15/737,338

(22) PCT Filed: May 17, 2016

(86) PCT No.: PCT/DE2016/200230
§ 371 (c)(1),
(2) Date: Dec. 18, 2017

(87) PCT Pub. No.: WO2017/020896
PCT Pub. Date: Feb. 9, 2017

(65) Prior Publication Data
US 2018/0163807 A1    Jun. 14, 2018

(30) Foreign Application Priority Data

Aug. 4, 2015   (DE) .................. 10 2015 214 860

(51) Int. Cl.
*F16F 3/087* (2006.01)
*F16F 1/38* (2006.01)
(Continued)

(52) U.S. Cl.
CPC .......... *F16F 3/0876* (2013.01); *F16F 1/3615* (2013.01); *F16F 1/38* (2013.01);
(Continued)

(58) Field of Classification Search
CPC .......... F16F 1/3615; F16F 1/38; F16F 3/0876; F16F 2228/066; B60G 7/001; B60G 2204/41; F16H 19/08
See application file for complete search history.

(56) References Cited

U.S. PATENT DOCUMENTS 2,684,819 A    7/1954  Leggett et al.
3,075,786 A *  1/1963  Freers ............... B60G 3/20
                                              267/222

(Continued)

FOREIGN PATENT DOCUMENTS

DE    3923149 A1    1/1991
DE    4203366 C1    4/1993
(Continued)

*Primary Examiner* — Melody M Burch
(74) *Attorney, Agent, or Firm* — Antun M. Peakovic

(57) ABSTRACT

A bearing bushing, for example, for a motor vehicle. The bearing bushing is switchable between a first and a second stiffness stage. The bearing bushing has a first elastomer ring, which is arranged rotationally fixedly on an outer circumferential surface of an inner ring, and a second elastomer ring, which is arranged rotationally fixedly on an inner circumferential surface of an outer ring. Radially between the two elastomer rings, an intermediate ring makes contact in a rotationally fixed manner with the two elastomer rings. To change in stiffness of the bearing bushing, the first elastomer ring can be bridged by the intermediate ring and at least one blocking ring which is arranged on the bearing bushing at an end side.

16 Claims, 2 Drawing Sheets

(51) Int. Cl.
*F16F 1/36* (2006.01)
*B60G 7/00* (2006.01)
*F16H 19/08* (2006.01)

(52) U.S. Cl.
CPC .......... *B60G 7/001* (2013.01); *B60G 2204/41* (2013.01); *F16F 2228/066* (2013.01); *F16H 19/08* (2013.01)

(56) References Cited

U.S. PATENT DOCUMENTS

| | | | | |
|---|---|---|---|---|
| 3,113,769 | A | * | 12/1963 | Pryale ........................ F16F 1/38 |
| | | | | 267/282 |
| 3,159,391 | A | * | 12/1964 | Barenyi .................. B60G 11/22 |
| | | | | 267/136 |
| 6,039,158 | A | * | 3/2000 | Fox ........................... B60L 7/00 |
| | | | | 188/162 |

FOREIGN PATENT DOCUMENTS

| | | | |
|---|---|---|---|
| DE | 69622141 | T2 | 11/2002 |
| DE | 102005012751 | A1 | 9/2006 |
| DE | 102006040958 | A1 | 3/2008 |
| GB | 411622 | A | 6/1934 |
| GB | 2041487 | A | 9/1980 |
| WO | 2005001308 | A1 | 1/2005 |

* cited by examiner

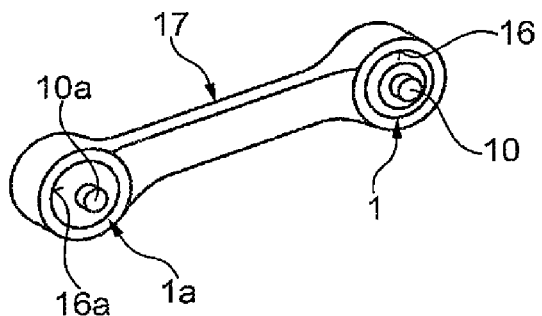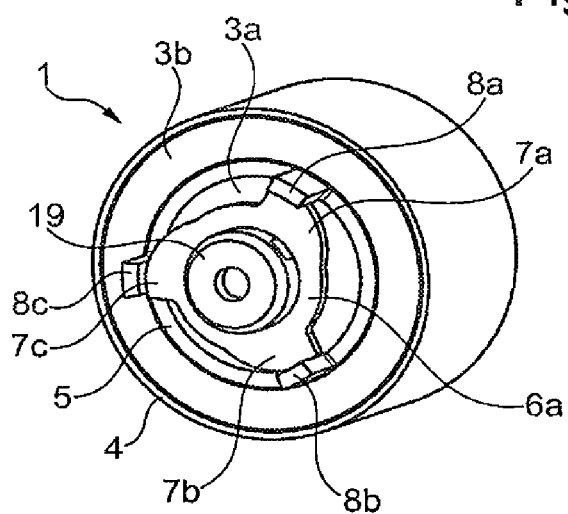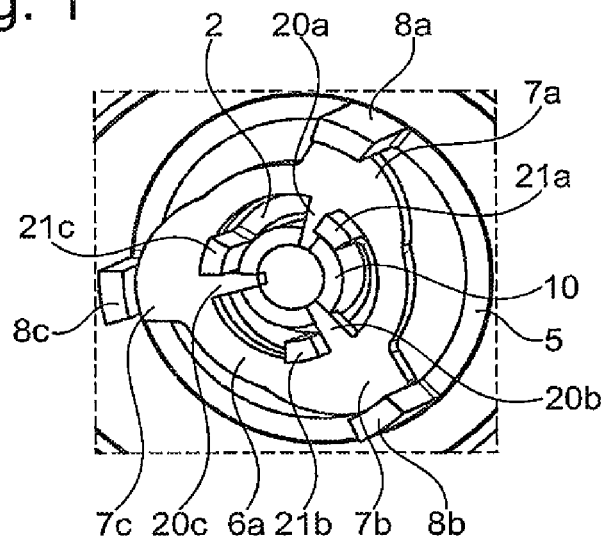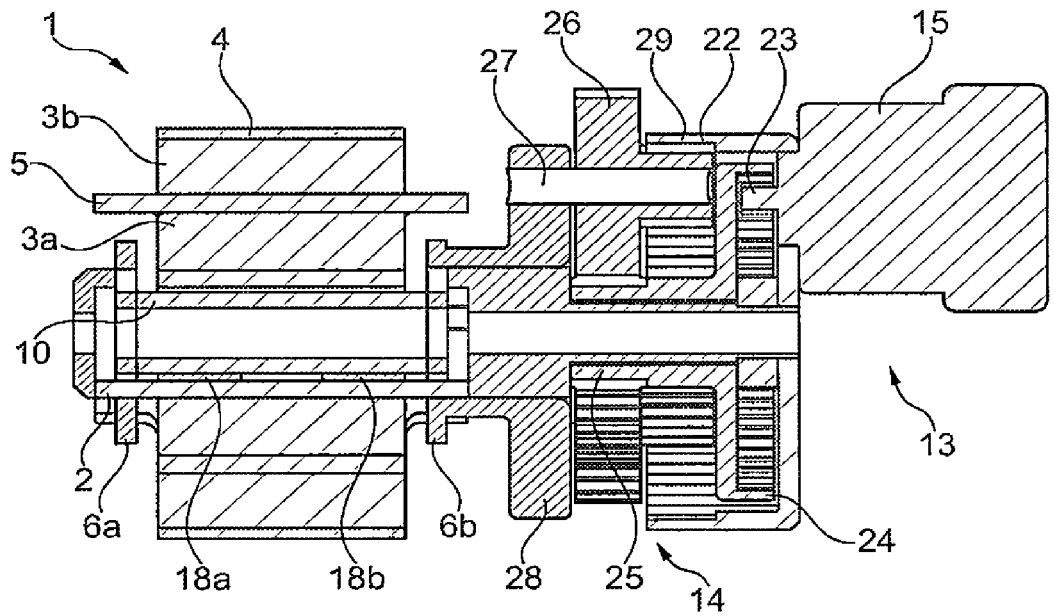

SWITCHABLE BEARING BUSHING FOR A MOTOR VEHICLE

CROSS-REFERENCE TO RELATED APPLICATIONS

This application is the U.S. National Phase of PCT Appln. No. PCT/DE2016/200230 filed May 17, 2016, which claims priority to DE 102015214860.2 filed Aug. 4, 2015, the entire disclosures of which are incorporated by reference herein.

TECHNICAL FIELD

The disclosure relates to a bearing bushing for a motor vehicle, wherein the bearing bushing is switchable between a first and a second stiffness stage.

BACKGROUND

The structure and the resulting operational data of bearing bushings that are used in a chassis of a motor vehicle can have a very great influence on the driving and steering characteristics of the motor vehicle. Relatively minor changes to a spring constant or stiffness of the bearing bushings can have considerable effects on the vehicle characteristics, such as for example the understeer or oversteer characteristics and chassis noises, vibrations and running harshness. Depending on the setting of the bearing bushing, the motor vehicle has a relatively "soft" or relatively "hard" running characteristic.

The generally known prior art has disclosed various bearing bushings in the chassis region of a motor vehicle. Firstly, purely mechanical bearing bushings or rubber bearings are known which have a defined stiffness. Furthermore, hydraulically damped chassis bushings with fixed or variable stiffness are known. Furthermore, bearings with magnetorheological liquids or magnetorheological elastomers are known, wherein the stiffness can be varied by means of a magnetic field.

For example, DE 696 22 141 T2 discloses a method for producing and using a suspension bushing with variable stiffness for controlling the relative movement between a suspension link in a motor vehicle and a frame component of the motor vehicle. The suspension bushing has a variable stiffness, which is realized by virtue of the fact that there is an enclosed magnetorheological elastomer or gel, the stiffness of which is variably adjustable over a wide range, specifically by means of a controllable magnetic field. The variable controllable magnetic field is generated by means of an electromagnetic structure which is completely integrated, as part of the structure, into a suspension bushing structure.

The problem addressed by the present disclosure includes providing a bearing bushing for a motor vehicle, the stiffness of which bearing bushing is mechanically adjustable and is thus not based on a hydraulic or magnetorheological operating principle.

SUMMARY

According to the disclosure, the bearing bushing has a first elastomer ring, which is arranged rotationally fixedly on an outer circumferential surface of an inner ring, and a second elastomer ring, which is arranged rotationally fixedly on an inner circumferential surface of an outer ring, wherein, radially between the two elastomer rings, an intermediate ring makes contact in a rotationally fixed manner with the two elastomer rings, wherein furthermore, for the change in stiffness of the bearing bushing, the first elastomer ring can be bridged by the intermediate ring and at least one blocking ring which is arranged on the bearing bushing at an end side. In other words, a change between a first and a second stiffness stage occurs by virtue of the fact that the intermediate ring comes into contact with the at least one blocking ring and thereby bridges the first elastomer ring arranged between the intermediate ring and the inner ring. The stiffness of the bearing bushing is consequently increased.

The at least one blocking ring preferably has at least three support elements for radially accommodating a respective axially formed lug of the intermediate ring. Here, the at least three lugs are formed axially on an end face of the intermediate ring. In a first switching position of the at least one blocking ring, the respective lugs come into contact with the respective support elements of the at least one blocking ring. In other words, the intermediate ring, and thus also the second elastomer ring and the outer ring connected rotationally fixedly thereto, are supported on the at least one blocking ring via the lugs and the support elements. In this way, the first elastomer ring is bridged, whereby the stiffness of the bearing bushing is relatively high. In a second switching position of the at least one blocking ring, the respective lugs are at least radially movable, wherein the respective lugs do not come into contact with the respective support elements of the at least one blocking ring element. In other words, the intermediate ring, and thus also the second elastomer ring and the outer ring connected rotationally fixedly thereto, are supported on the inner ring via the first elastomer ring. By the series connection of the two elastomer rings, a relatively soft damping action is realized, wherein the bearing bushing has a relatively low stiffness.

In one embodiment, the at least one blocking ring is mounted rotatably on the inner ring by means of a bearing element. The bearing element is preferably in the form of a plain bearing bushing or rolling bearing. Consequently, in the first switching position of the bearing bushing, the force flow runs from the outer ring into the second elastomer ring, and via the intermediate ring and the at least one blocking ring into the inner ring.

In a further embodiment, the at least one blocking ring is connected rotationally fixedly to a bolt which is mounted rotatably on the inner ring. In particular, the bolt is mounted rotatably on an inner circumferential surface of the inner ring. For this purpose, at least one bearing element is arranged between the inner ring and the bolt. Consequently, in the first switching position of the bearing bushing, the force flow runs from the outer ring into the second elastomer ring, and via the intermediate ring and the at least one blocking ring into the bolt.

It is particularly preferable for at least one blocking ring to be provided for each of the two end faces of the bearing bushing. Thus, in the first switching position, the intermediate ring is supported radially on two blocking rings, wherein a first blocking ring is arranged axially on a first end face of the bearing bushing, and wherein a second blocking ring is arranged axially on a second end face of the bearing bushing. In particular, the two blocking rings are axially spaced apart from the respective end face of the bearing bushing and thus do not come into contact therewith.

In a further embodiment, the at least one blocking ring has a respective first and second aperture for each lug, which apertures are connected to one another, wherein the respective first aperture is of substantially complementary form with respect to the respective lug, and wherein the respective second aperture is at least radially larger than the respective first aperture. Consequently, the respective first and second aperture form a coherent aperture in which the respective lug is movable during a rotation of the blocking ring in a circumferential direction. In other words, for the change in stiffness of the bearing bushing, the at least one blocking ring is rotated such that the respective lug passes out of the first aperture into the second aperture. In the respective first aperture, the respective lug comes into contact with the blocking ring radially when the bearing bushing is subjected to load. By contrast, in the respective second aperture, the respective lug is movable both radially and axially, and does not come into contact with the blocking ring, when the bearing bushing is subjected to load. Consequently, in the first switching position, the at least one blocking ring realizes at least a partial blockage of the freedom of movement of the intermediate ring, and thus a stiffening of the bearing bushing.

It is advantageous for two blocking rings to be arranged axially adjacent to one another on an end face of the bearing bushing. In particular, for the change in stiffness of the bearing bushing, the two blocking rings are rotatable relative to one another. For this purpose, the two apertures in the respective blocking ring are arranged oppositely. Thus, a change in stiffness of the bearing bushing is realized by a rotation of the first blocking ring in a first direction of rotation and a rotation of the second blocking ring in a second direction of rotation.

The disclosure encompasses the technical teaching whereby, for the change in stiffness of the bearing bushing, the at least one blocking ring is rotatable, by an actuator connected at least indirectly thereto, relative to the intermediate ring. The blocking ring preferably has a toothing on an outer circumferential surface, which toothing meshes with a pinion shaft of the actuator. It is furthermore preferable for the actuator to be connected to the at least one blocking ring via a gearing arrangement. Here, the gearing arrangement is arranged axially on the bearing bushing. It is furthermore preferable for the actuator to comprise an electric motor.

BRIEF DESCRIPTION OF THE DRAWINGS

Further measures which improve the disclosure will be presented in more detail below together with the description of embodiments of the disclosure on the basis of the figures. In the figures:

FIG. 1 is a perspective illustration of a chassis link for a motor vehicle, wherein the chassis link has a bearing bushing according to an embodiment of the disclosure, FIG. 2a is a perspective illustration of the bearing bushing according to the disclosure as per a first exemplary embodiment, FIG. 2b is a perspective detail illustration of the bearing bushing according to the disclosure from FIG. 2a, FIG. 3 is a schematic sectional illustration for illustrating the construction of the bearing bushing according to the disclosure from FIG. 2a together with gearing arrangement and actuator.

DETAILED DESCRIPTION

Figure 4A:
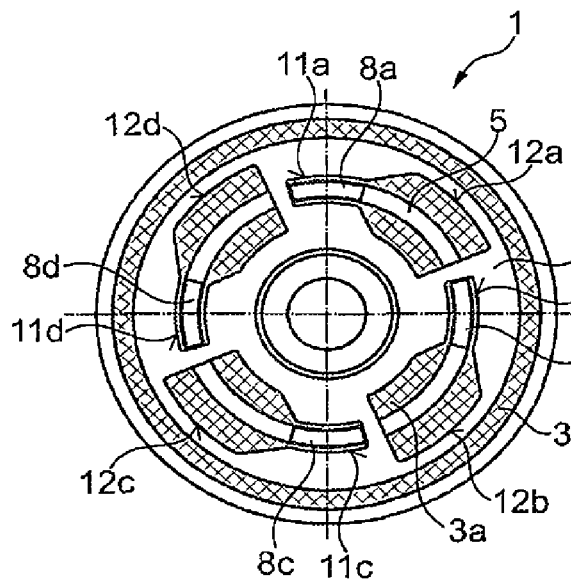
FIG. 4a shows a schematic side view of the bearing bushing according to the disclosure as per a second exemplary embodiment.

In FIG. 1, a bearing bushing according to the disclosure is arranged in a bore 16, provided for the purpose, on a chassis link 17. The chassis link 17 is installed in a chassis (not illustrated here) of a motor vehicle (not illustrated here). An axle support (not illustrated here) of the motor vehicle is fastened to a bolt 10 of the bearing bushing 1. Furthermore, the chassis link 17 has a further bore 16a in which there is arranged a mechanical, non-switchable bearing bushing 1a. In other words, the bearing bushing 1a is designed as a conventional rubber bearing. A wheel support (not illustrated here) is arranged on a bolt 10a of the bearing bushing 1a.

As per FIG. 2a, a bearing bushing 1 according to the disclosure has a first and a second elastomer ring 3a, 3b. The first elastomer ring 3a is arranged rotationally fixedly on an inner ring 2 illustrated in FIG. 2b. By contrast, the second elastomer ring 3b is arranged radially between an intermediate ring 5 and an outer ring 4. Furthermore, the intermediate ring 5 makes contact with the first elastomer element 3a radially. Furthermore, a blocking ring 6a is arranged on the bearing bushing 1 at an end side, which blocking ring has three support elements 7a-7c for radially accommodating a respective axially formed lug 8a-8c of the intermediate ring 5. The blocking ring 6a is secured axially by a covering element 19 arranged axially thereon. For the change in stiffness of the bearing bushing 1, the first elastomer ring 3a can be bridged via the intermediate ring 5 and the blocking ring 6a. For this purpose, as illustrated in FIG. 2a, the intermediate ring 5 comes into contact with the blocking ring 6a radially via the three lugs 8a-8c. In this illustrated switching position of the blocking ring 6a, the bearing bushing 1 has a relatively high stiffness.

FIG. 2b is a detail illustration of FIG. 2a, with the covering element 19 not being illustrated. As per FIG. 2b, the bolt 10 is arranged within the inner ring 2. Here, the bolt 10 is connected rotationally fixedly to the blocking ring 6a, wherein three radially formed elements 20a-20c on the blocking ring 6a are connected in positively locking fashion to the bolt 10. Furthermore, the inner ring 2 has three axially formed elements 21a-21c for positively locking connection to the covering element 19. Furthermore, during a rotation of the blocking ring 6a, the axially formed elements 21a-21c on the inner ring 2 are provided as stop surfaces for the radially formed elements 20a-20c on the blocking ring 6a, and thus, in the respective switching position, position the support elements 7a-7c on the blocking ring 6a relative to the lugs 8a-8c on the intermediate ring 5.

As per FIG. 3, the bearing bushing 1 according to the disclosure from FIG. 2a has an actuator 13 which is connected to the blocking ring 6b via a gearing arrangement 14. Consequently, in each case one blocking ring 6a, 6b is provided for each of the two end faces of the bearing bushing 1. Furthermore, the blocking ring 6b is connected rotationally fixedly to the blocking ring 6a via the bolt 10. The bolt 10 is mounted rotatably on the inner ring 2 by means of two plain bearing bushings 18a, 18b. For the change in stiffness of the bearing bushing 1, the two blocking rings 6a, 6b are rotated, via the gearing arrangement 14, by an electric motor 15 of the actuator 13. The electric motor 15 is arranged axially on a housing 22 of the gearing arrangement 14. The electric motor 15 drives the gearing arrangement 14 via a pinion shaft 23. For this purpose, the pinion shaft 23 meshes with an internal gear 24, wherein the internal gear 24 is formed integrally with a sun gear 25. Furthermore, the sun gear 25 meshes with a stepped planetary gear set 26, which is connected to the blocking ring 6b via a bolt 27. For this purpose, the blocking ring 6b has a section of flange-like form, which is simultaneously a planet carrier 28. Furthermore, the stepped planetary gear set 26 also meshes with an internal gear 29 which is formed in the housing 22 and which is fixed so as to be stationary. The first elastomer ring 3a is arranged rotationally fixedly radially between the inner ring 2 and the intermediate ring 5. Furthermore, the second elastomer ring 3b is arranged rotationally fixedly radially between the intermediate ring 5 and the outer ring 4. The outer ring 4 is of sleeve-like form and is pressed into a bore (not illustrated here) of a chassis link (not illustrated here).

Figure 4B:
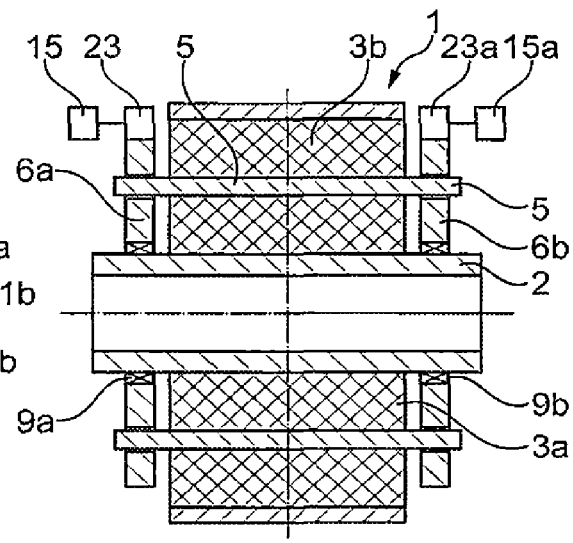
FIG. 4b is a schematic sectional illustration of the bearing bushing according to the disclosure from FIG. 4a, FIG. 5a is a schematic detail illustration of the bearing bushing according to the disclosure in a first switching position.

As per FIGS. 4a and 4b, in each case one blocking ring 6a, 6b is provided for each of the two end faces of the bearing bushing 1. The intermediate ring 5 has in each case four axially formed lugs 8a-8d to both axial sides, of which however only four lugs 8a-8d are illustrated owing to the side-on illustration of the bearing bushing 1. The two blocking rings 6a, 6b are of identical form. Each blocking ring 6a has a respective first and second aperture 11a-11d, 12a-12d for each lug 8a-8d, which apertures are connected to one another, wherein the respective first aperture 11a-11d is of substantially complementary form with respect to the respective lug 8a-8d. In other words, the respective lug 8a-8d has only minimal play in the respective first aperture 11a-11d, such that, when the bearing bushing 1 is subjected to load, the first elastomer ring 3a is bridged by means of the intermediate ring 5 and the two blocking rings 6a, 6b. Furthermore, the respective second aperture 12a-12d is formed so as to be more than twice as large as the first aperture 11a-11d, such that, when the bearing bushing 1 is subjected to load, a substantially radial displacement of the intermediate ring 5 is permitted, and thus an exertion of load on both elastomer rings 3a, 3b is realized.

As per FIG. 4b, the respective blocking ring 6a, 6b is rotatable by a respective electric motor 15, 15a with respective pinion shaft 23, 23a. For this purpose, the respective blocking ring 6a, 6b is mounted rotatably on the inner ring 2 by a respective bearing element 9a, 9b.

Figure 5A:
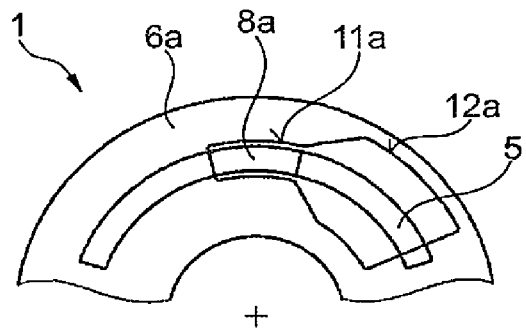
FIG. 5b is a schematic detail illustration of the bearing bushing according to the disclosure in a second switching position.
Figure 5B:
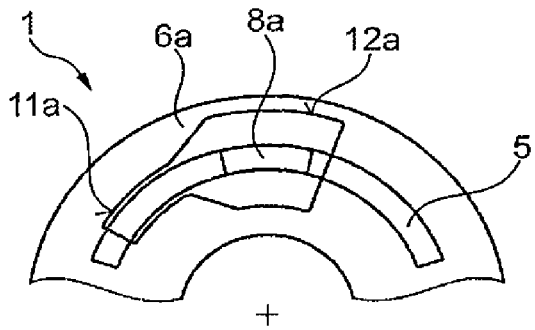

FIGS. 5a and 5b show a partially illustrated switchable bearing bushing 1 according to the disclosure, which is switchable between a first and a second stiffness stage, wherein FIG. 5b illustrates a relatively low stiffness stage and FIG. 5a illustrates a relatively high stiffness stage of the switchable bearing bushing 1. The relatively high stiffness stage is realized in that, when the bearing bushing 1 is subjected to load, the lug 8a of the intermediate ring 5 makes contact in the first aperture 11a of the blocking ring 6a. The relatively low stiffness stage is realized in that, when the bearing bushing 1 is subjected to load, the lug 8a is freely movable in the second aperture 12a.

Figure 6A:
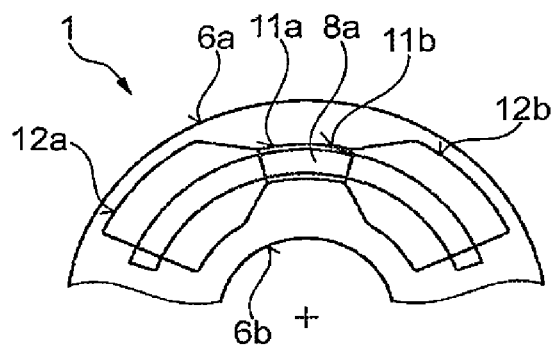
FIG. 6a is a schematic detail illustration of the bearing bushing according to the disclosure with two axially mutually adjacently arranged blocking rings in a first switching position.
Figure 6B:
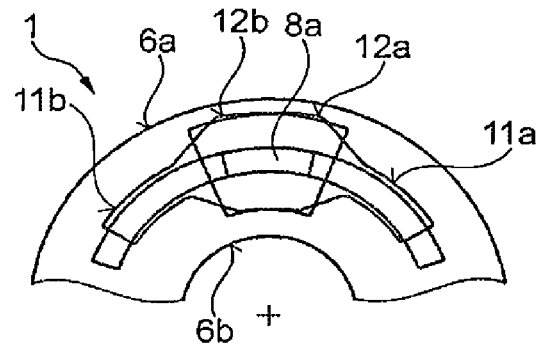
FIG. 6b is a schematic detail illustration of the bearing bushing according to the disclosure with two axially mutually adjacently arranged blocking rings in a second switching position.

As per FIGS. 6a and 6b, two blocking rings 6a, 6b are arranged axially adjacent to one another on an end face of the bearing bushing 1. For the change in stiffness of the bearing bushing 1, the two blocking rings 6a, 6b are rotatable relative to one another. For this purpose, the two apertures 11a, 12a and 11b, 12b in the respective blocking ring 6a, 6b are arranged oppositely. FIG. 6b illustrates a relatively low stiffness stage, and FIG. 6a illustrates a relatively high stiffness stage of the switchable bearing bushing 1. A change in stiffness of the bearing bushing 1 from the position illustrated in FIG. 6a into the position illustrated in FIG. 6b is realized by means of a rotation of the first blocking ring 6a clockwise and a rotation of the second blocking ring 6b counterclockwise. The embodiment of the bearing bushing 1 with two axially mutually adjacently arranged blocking rings 6a, 6b offers the advantage in particular that the lug 8a is blocked in a circumferential direction and radially in the respective first aperture 11a, 11b of the two blocking rings 6a, 6b.

It is pointed out that the respective blocking rings 6a, 6b have been illustrated in transparent form in FIGS. 5a, 5b, 6a and 6b.

LIST OF REFERENCE DESIGNATIONS

1 Bearing bushing
2 Inner ring
3a, 3b Elastomer ring
4 Outer ring
5 Intermediate ring
6a, 6b Blocking ring
7a-7d Support elements
8a-8d Lug
9a, 9b Bearing element
10 Bolt
11a-11d First aperture
12a-12d Second aperture
13 Actuator
14 Gearing arrangement
15, 15a Electric motor
16, 16a Bore
17 Chassis link
18, 18a Bolt
19 Covering element
20a-20c Axially formed element
21a-21c Radially formed element
22 Housing
23, 23a Pinion shaft
24 Internal gear
25 Sun gear
26 Stepped planetary gear set
27 Bolt
28 Planet carrier
29 Internal gear

The invention claimed is:

1. A bearing bushing for a motor vehicle, comprising:
a bearing bushing that is configured to be switchable between a first and a second stiffness stage;
the bearing bushing having a first elastomer ring, which is arranged rotationally fixedly on an outer circumferential surface of an inner ring, and a second elastomer ring, which is arranged rotationally fixedly on an inner circumferential surface of an outer ring; and
wherein, radially between the two elastomer rings, an intermediate ring makes contact in a rotationally fixed manner with the two elastomer rings, wherein furthermore, for the switch in stiffness of the bearing bushing, the first elastomer ring can be bridged by the intermediate ring and at least one blocking ring which is arranged on the bearing bushing at an end side;
wherein the at least one blocking ring has at least three support elements that each radially accommodate an axially formed lug of the intermediate ring;

wherein the at least one blocking ring has a first and a second aperture for each lug, which apertures are connected to one another, wherein the first aperture is of substantially complementary form with respect to the lug, and wherein the second aperture is at least radially larger than the first aperture.

2. The bearing bushing as claimed in claim 1, wherein the at least one blocking ring is mounted rotatably on the inner ring by a bearing element.

3. The bearing bushing as claimed in claim 1, wherein the at least one blocking ring is connected rotationally fixedly to a bolt which is mounted rotatably on the inner ring.

4. The bearing bushing as claimed in claim 1, wherein the at least one blocking ring is provided for each of two end faces of the bearing bushing.

5. The bearing bushing as claimed in claim 4, wherein the at least one blocking ring includes two blocking rings arranged axially adjacent to one another on at least one of the two end faces of the bearing bushing.

6. The bearing bushing as claimed in claim 1, wherein, for the switch in stiffness of the bearing bushing, the at least one blocking ring is rotatable, by an actuator connected at least indirectly thereto, relative to the intermediate ring.

7. The bearing bushing as claimed in claim 6, wherein the actuator is connected to the at least one blocking ring via a gearing arrangement.

8. The bearing bushing as claimed in claim 6, wherein the actuator comprises an electric motor.

9. A bearing bushing, comprising:
a bearing bushing configured to be switchable between a first stiffness and a second stiffness, the first stiffness being different from the second stiffness;
a first elastomer ring arranged rotationally fixedly on an outer circumferential surface of an inner ring;
a second elastomer ring arranged rotationally fixedly on an inner circumferential surface of an outer ring; and
an intermediate ring radially between the two elastomer rings, the intermediate ring making contact in a rotationally fixed manner with the first and second elastomer rings;
wherein to switch between the first and second stiffness, the first elastomer ring is configured to be bridged by the intermediate ring and at least one blocking ring which is arranged on the bearing bushing at an end side
wherein the at least one blocking ring has at least three support elements that each radially accommodate an axially formed lug of the intermediate ring;
wherein the at least one blocking ring has a first and a second aperture for each lug, which apertures are connected to one another, wherein the first aperture is of substantially complementary form with respect to the lug, and wherein the second aperture is at least radially larger than the first aperture.

10. The bearing bushing as claimed in claim 9, wherein the at least one blocking ring is mounted rotatably on the inner ring by a bearing element.

11. The bearing bushing as claimed in claim 9, wherein the at least one blocking ring is connected rotationally fixedly to a bolt which is mounted rotatably on the inner ring.

12. The bearing bushing as claimed in claim 9, wherein at least one blocking ring is provided for each of two end faces of the bearing bushing.

13. The bearing bushing as claimed in claim 9, wherein the at least one blocking ring includes two blocking rings arranged axially adjacent to one another on an end face of the bearing bushing.

14. The bearing bushing as claimed in claim 9, wherein, for the switch in stiffness of the bearing bushing, the at least one blocking ring is rotatable, by an actuator connected at least indirectly thereto, relative to the intermediate ring.

15. The bearing bushing as claimed in claim 14, wherein the actuator is connected to the at least one blocking ring via a gearing arrangement.

16. The bearing bushing as claimed in claim 14, wherein the actuator comprises an electric motor.

* * * * *